(12) United States Patent
Choi et al.

(10) Patent No.: US 8,374,148 B2
(45) Date of Patent: Feb. 12, 2013

(54) HANDOFF METHOD IN WIRELESS LAN, AND ACCESS POINT AND MOBILE STATION PERFORMING HANDOFF METHOD

(75) Inventors: Hyong-uk Choi, Seoul (KR); Jun-hwan Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2479 days.

(21) Appl. No.: 10/705,205

(22) Filed: Nov. 12, 2003

(65) Prior Publication Data

US 2004/0224690 A1 Nov. 11, 2004

(30) Foreign Application Priority Data

Jan. 23, 2003 (KR) .................. 10-2003-0004509

(51) Int. Cl.
 *H04W 4/00* (2009.01)
(52) U.S. Cl. .................. 370/331; 370/332; 370/346
(58) Field of Classification Search .................. 370/908, 370/331, 332, 346; 5/908
 See application file for complete search history.

(56) References Cited

U.S. PATENT DOCUMENTS

| | | | |
|---|---|---|---|
| 5,991,287 A | 11/1999 | Diepstraten et al. | |
| 6,061,563 A * | 5/2000 | Lee ................ | 455/435.1 |
| 6,108,547 A | 8/2000 | Yamashita et al. | |
| 6,188,883 B1 | 2/2001 | Takemura | |
| 6,208,629 B1 * | 3/2001 | Jaszewski et al. ........... | 370/329 |
| 6,332,077 B1 * | 12/2001 | Wu et al. ................ | 455/432.1 |
| 6,360,264 B1 * | 3/2002 | Rom ................ | 709/227 |
| 6,473,413 B1 | 10/2002 | Chiou et al. | |
| 6,587,680 B1 * | 7/2003 | Ala-Laurila et al. .......... | 455/411 |
| 6,850,503 B2 * | 2/2005 | Dorenbosch et al. ......... | 370/331 |
| 6,990,343 B2 * | 1/2006 | Lefkowitz ................ | 455/436 |
| 6,993,334 B2 * | 1/2006 | Andrus et al. ................ | 455/437 |
| 7,006,481 B2 * | 2/2006 | Terry ................ | 370/338 |
| 7,020,438 B2 * | 3/2006 | Sinivaara et al. ............ | 455/41.2 |
| 7,054,627 B1 * | 5/2006 | Hillman ................ | 455/422.1 |
| 7,103,359 B1 * | 9/2006 | Heinonen et al. ............. | 455/436 |
| 7,471,656 B2 * | 12/2008 | Karoubalis et al. ........... | 370/331 |
| 2001/0024953 A1 * | 9/2001 | Balogh ................ | 455/432 |
| 2001/0049282 A1 * | 12/2001 | Ushiki et al. ................ | 455/422 |
| 2002/0118656 A1 | 8/2002 | Agrawal et al. | |
| 2002/0163928 A1 * | 11/2002 | Rudnick et al. ............... | 370/444 |

(Continued)

FOREIGN PATENT DOCUMENTS

EP 0 394 995 A2 10/1990
EP 0 412 829 A2 2/1991

(Continued)

OTHER PUBLICATIONS

Weyland; ("Mobile-Controlled Handover in Wireless LANs") ;2001; RVS; pp. 1-76.*

(Continued)

*Primary Examiner* — Ricky Ngo
*Assistant Examiner* — Dewanda Samuel
(74) *Attorney, Agent, or Firm* — Sughrue Mion, PLLC (57) ABSTRACT

A handoff method for a mobile station in a wireless local area network, the handoff method includes outputting a handoff alert message to a present access point, receiving a response message from the present access point, the response message including channel information on access point in an extended service set, and scanning channels by using the channel information to select a new access point.

12 Claims, 11 Drawing Sheets

U.S. PATENT DOCUMENTS

| | | | |
|---|---|---|---|
| 2002/0176366 A1* | 11/2002 | Ayyagari et al. | 370/245 |
| 2002/0191627 A1 | 12/2002 | Subbiah et al. | |
| 2003/0134642 A1* | 7/2003 | Kostic et al. | 455/450 |
| 2003/0203735 A1* | 10/2003 | Andrus et al. | 455/450 |
| 2004/0014422 A1* | 1/2004 | Kallio | 455/41.1 |
| 2004/0039817 A1* | 2/2004 | Lee et al. | 709/225 |
| 2004/0137905 A1* | 7/2004 | Jeong et al. | 455/450 |
| 2004/0166870 A1* | 8/2004 | Backes | 455/452.2 |
| 2004/0202141 A1* | 10/2004 | Sinivaara et al. | 370/338 |
| 2005/0053043 A1* | 3/2005 | Rudolf et al. | 370/337 |
| 2006/0153133 A1* | 7/2006 | Zhong | 370/331 |
| 2008/0032628 A1* | 2/2008 | Vehvilainen et al. | 455/41.2 |
| 2009/0010222 A1* | 1/2009 | Jechoux | 370/331 |

FOREIGN PATENT DOCUMENTS

| | | |
|---|---|---|
| EP | 0589552 A | 3/1994 |
| EP | 0 851 633 A2 | 7/1998 |
| EP | 1 235 449 A1 | 8/2002 |
| JP | 08-186858 A | 7/1996 |
| JP | 10-210533 A | 8/1998 |
| JP | 2001094572 | 4/2001 |
| JP | 2001-168924 A | 6/2001 |
| JP | 2002-076993 A | 3/2002 |
| KR | 2002-0023917 A | 3/2002 |
| KR | 2002-23918 A | 3/2002 |
| RU | 2145774 C1 | 2/2000 |
| RU | 2180159 C2 | 2/2002 |
| WO | 99/01005 A1 | 1/1999 |
| WO | 00/62438 A1 | 10/2000 |
| WO | 0105121 | 1/2001 |
| WO | WO 02/41587 A2 | 5/2002 |
| WO | 02071084 A | 9/2002 |
| WO | 03/005643 A1 | 1/2003 |

OTHER PUBLICATIONS

Kaveh Pahlavan et al.: "Handoff in Hybrid Mobile Data Networks" IEEE Personal Communications, IEEE Communications Society, US, vol. 7, No. 2, Apr. 2000, pp. 34-47, XP011092387.

Canadian Search Report issued Jul. 26, 2011 in Canadian Patent Application No. 2,449,530.

European Search Report, dated Feb. 22, 2011, issued in Application No. 10185390.1.

Office Action issued in corresponding Russian Application No. 2003133315, dated Jun. 16, 2005.

Japanese Office Action issued in corresponding Japanese Application No. 2003-423613, dated Aug. 5, 2008.

Japanese Office Action issued in corresponding Japanese Application No. 2003-423613, dated Apr. 1, 2008.

Communication from the Intellectual Property Office of Singapore issued in corresponding Singapore Patent Application No. 200306789-9, dated Jul. 24, 2006.

Philippines Office Action issued in corresponding Philippines Application No. 12003000528, dated Aug. 28, 2007.

Zhun Zong: "RRM and Roaming Support", IEEE 802. 11-03/078r0, 2003, slides 2-11.

Itzik Kitroser: "IEEE 802. 16e Mobility Enhancements", IEEE C802. 16e03/05, 2003, figs 2-3, section 2.4.1-2.4.4.

Communication, dated Sep. 27, 2012, issued by the Canadian Intellectual Property Office in counterpart Canadian Patent Application No. 2,449,530.

Shiann-Tsong Sheu, et al., "Dynamic Access Point Approach (DAPA) for IEEE 802.11 Wireless LANs," Vehicular Technology Conference (VTC 1999), vol. 5, 1999, pp. 2646-2650.

* cited by examiner

HANDOFF METHOD IN WIRELESS LAN, AND ACCESS POINT AND MOBILE STATION PERFORMING HANDOFF METHOD

CROSS-REFERENCE TO RELATED APPLICATION

This application claims the priority of Korean Patent Application No. 2003-4509, filed on Jan. 23, 2003, in the Korean Intellectual Property Office, the disclosure of which is incorporated herein by reference.

BACKGROUND OF THE INVENTION

1. Field of the Invention

The present invention relates to a handoff method for a mobile station in a wireless local area network (LAN), and more particularly, to a handoff method that secures a quality of service (QoS) in a wireless LAN, and an access point (AP) and a mobile station that perform the handoff method in the wireless LAN.

2. Description of the Related Art

In response to increasing popularity of multimedia networking, researches are being conducted to secure a quality of service (QoS) in a multimedia network. With recognition of wireless networking, markets now demand that a wireless network provide the same QoS of existing wired networks. Standards have been developed with regards to the above issue. In particular, 802.11a and 802.11g focus on providing support for an increased bandwidth, while 802.11e is intended to address the issues of a QoS in a wireless LAN.

However, the development of MAC techniques that support a QoS has been viewed as of little value in a mobile environment. That is, MAC techniques do not support the fast handoff service that is required for a QoS in the mobile environment. Therefore, a QoS for real-time multimedia data cannot be secured due to the delay generated as a mobile station moves from one cell to another cell in a wireless LAN.

Figure 1:
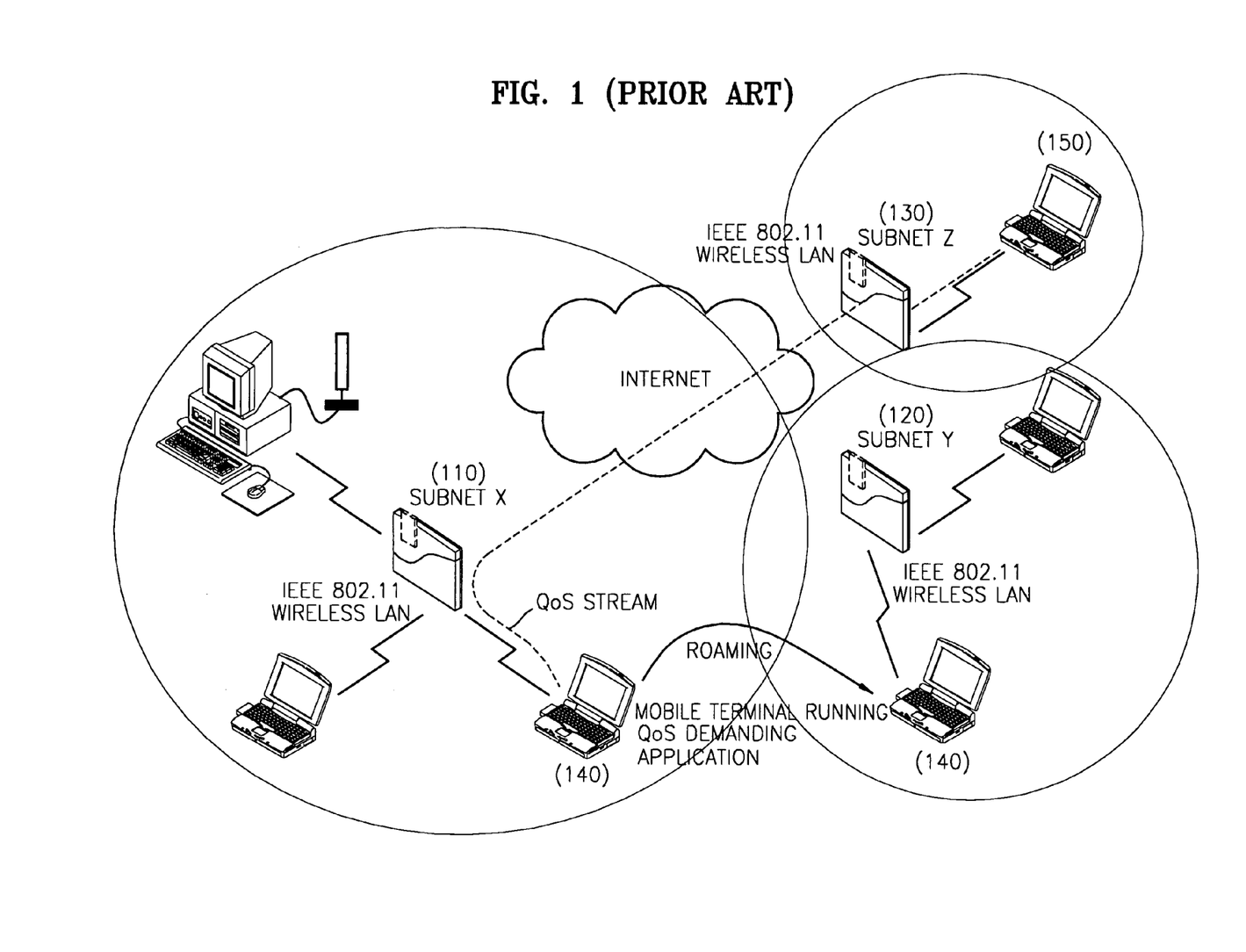
FIG. 1 is a diagram illustrating a wireless local area network (LAN) in which a conventional handoff operation takes place.

FIG. 1 illustrates a roaming process of a mobile station 140 to a subnet Y 120, while a QoS connection is established between a mobile station 150 in a subnet Z 130 and the mobile station 140 in a subnet X 110.

A conventional handoff method in a wireless LAN will be described, that is, moving the mobile station 140 from the subnet X 110 to the subnet Y 120 in a MAC environment. It is assumed that substantial roaming occurs within one extended service set (ESS), and the subnet X 110 and the subnet Y 120 of FIG. 1 are present within one ESS while having portions that overlap each other.

Where the mobile station 140 in the subnet X 110 approaches the subnet Y 120, a channel search operation is performed, due to a weakened signal from the subnet X 110. Where the number of channels in the subnet Y 120 is 12, the mobile station 140 that performs the roaming receives beacon frames from all 12 channels in the subnet Y 120 while in a passive mode, and sends probe request messages to all 12 channels in the subnet Y 120 while in an active mode.

In this scenario, the mobile station 140 selects an access point (AP) from the subnet Y 120 that sends a stronger beacon frame or stronger probe response message. The mobile station 140 sends a reassociation request message to the new AP of subnet Y 120 including information on its previous AP of subnet X 120. The previous AP is unaware of the handoff until the new AP informs the previous AP using an inter access point protocol (IAPP). The APs communicate over a wired LAN or another media.

The conventional roaming service in a wireless LAN, as shown and described with FIG. 1, provides a connectionless-based roaming. Where the mobile station 140 is receiving real-time streaming data, a QoS cannot be guaranteed since the previous AP of subnet X 110 is unaware of the handoff state of the mobile station 140 until the roaming is completed. In addition, the AP of subnet X 110 continuously sends QoS data to the mobile station 140 in the handoff state since the AP does not receive acknowledgement messages with respect to the data. Accordingly, the performance of the subnet X 110 is lowered. In addition, the mobile station 140 may completely lose the QoS stream, and even where the mobile station 140 recovers the QoS stream by using an IAPP, a significant data loss is inevitable.

Figure 2:
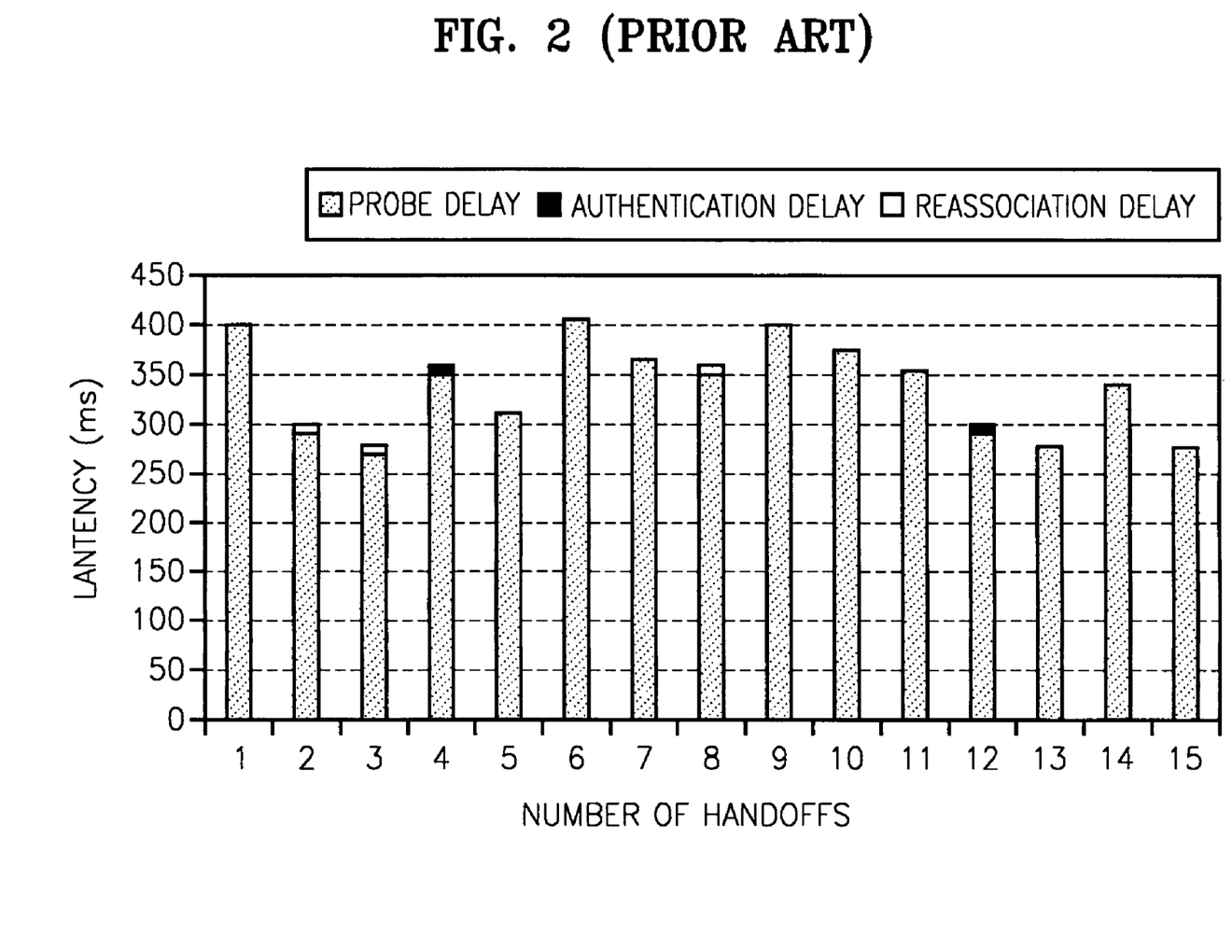
FIG. 2 is a graph illustrating probe delays in the conventional handoff operation.

Another problem of the conventional roaming service is that about 90% to 95% of delays are probe delays of 200 to 400 ms, due to the search of media, as shown in FIG. 2. For example, where 12 channels are present in one subnet, all channels are scanned regardless of channel use. Accordingly, the mobile station 140 sends probe request messages to all channels and waits for the responses according to a MinChannelTime. In addition, even where the mobile station 140 receives a response message, the mobile station 140 waits for a MaxChannelTime to determine whether another AP is using the channel. However, a basic service set (BSS) uses only about four channels to avoid channel interferences. Therefore, the process of scanning of all channels causes unnecessary probe delays.

The handoff method is one of the important fields of a wireless LAN environment. This is because as the speed of the wireless LAN environment increases, frequency bands increase and areas to send data decrease. In addition, due to the demand of a QoS for multimedia data, a faster handoff technology is needed. Even with the enhanced mobile functions with respect to a layer 3 by using an IPv6 technology, the needed handoff technology is not provided because a fast handoff technology is not realized at a MAC layer, i.e., a layer 2.

SUMMARY OF THE INVENTION

Accordingly, it is an aspect of the present invention to provide a handoff method to realize a fast handoff and secure a quality of service (QoS) on a MAC layer in a wireless local area network (LAN), and an access point (AP) and a mobile station that perform the handoff in the wireless LAN.

Additional aspects and/or advantages of the present invention will be set forth in part in the description which follows and, in part, will be obvious from the description, or may be learned by practice of the invention.

To achieve the above and/or other aspects of the present invention, according to an embodiment of the present invention, there is provided a handoff method for a mobile station in a wireless local area network, the method comprising receiving channel information on access points in an extended service set from a present access point of the mobile station, and scanning channels by using the channel information to select a new access point of the mobile station.

The channel information corresponding to each access point of the access points in the extended service set may comprise an address of the access point, information on a channel used by the access point, and information on one or more access points adjacent to the access point.

The method may further comprise outputting a handoff alert message to the present access point, wherein the receiving of the channel information comprises receiving a response message corresponding to the handoff alert message, the response message including the channel information. The outputting of the handoff alert message may comprise outputting the handoff alert message in response to receiving a weak signal from the present access point.

To achieve the above and/or other aspects of the present invention, according to another embodiment of the present invention, there is provided a handoff method for a mobile station in a wireless local area network, the method comprising selecting a new access point, outputting a reassociation message to the new access point, and receiving a reassociation response message from the new access point in response to a temporary connection being established between the new access point and a previous access point of the mobile station.

The selecting of the new access point may comprise outputting a handoff alert message to the previous access point, receiving a response message from the previous access point, the response message including channel information on access points in an extended service set, scanning channels by using the channel information included in the response message, and selecting an access point with a strongest signal as the new access point.

To achieve the above and/or other aspects of the present invention, according to still another embodiment of the present invention, there is provided a handoff method for an access point of a mobile station in a wireless local area network, the method comprising collecting channel information on access points in an extended service set in response to receiving a handoff alert message from the mobile station, and outputting a response message corresponding to the handoff alert message to the mobile station, the response message including the channel information.

The collecting of the channel information may comprise broadcasting handoff notification messages to the access points in the extended service set, and receiving acknowledgement messages including the channel information from the access points in the extended service set.

The method may further comprise outputting an acknowledgement message including personal channel information in response to receiving a handoff notification message from a present access point of the mobile station. The method may further comprise stopping services to the mobile station in response to a temporary connection being established with a new access point of the mobile station, and outputting service data to the new access point through the temporary connection.

To achieve the above and/or other aspects of the present invention, according to yet another embodiment of the present invention, there is provided a handoff method for an access point of a mobile station in a wireless local area network, the method comprising establishing a temporary connection with a previous access point of the mobile station in response to receiving a reassociation message, outputting a reassociation response message corresponding to the reassociation message to the mobile station in response to establishing the temporary connection, establishing an optimum connection with the mobile station, and terminating the temporary connection with the previous access point in response to establishing the optimum connection.

The method may further comprise buffering data received from the previous access point through the temporary connection. The method may further comprise stopping the buffering of the data in response to the reassociation response message being sent to the mobile station.

To achieve the above and/or other aspects of the present invention, according to still yet another embodiment of the present invention, there is provided a handoff method for a mobile station in a wireless local area network, the method comprising selecting a new access point by scanning channels according to channel information received from a present access point, and reassociating with the new access point in response to a temporary connection being established between the new access point and the present access point.

To achieve the above and/or other aspects of the present invention, according to an embodiment of the present invention, there is provided an access point performing a handoff with respect to a mobile station in a wireless local area network, the access point comprising a handoff alert message process unit which receives a handoff alert message and outputs a response message corresponding to the handoff alert message to the mobile station, and a channel information collection unit which collects channel information on access points in an extended service set, wherein the channel information is included in the response message.

The channel information collection unit may comprise a handoff notification message send unit which outputs a handoff notification message to collect the channel information on the access points in the extended service set, and a handoff notification acknowledgement message receiving unit which receives a handoff response message from the access points, the channel information on the access points being provided by way of the handoff response message.

The access point may further comprise a reassociation message process unit which receives a reassociation message from the mobile station and outputs a response message corresponding to the reassociation message to the mobile station, and a temporary connection/termination process unit which establishes a temporary connection with a previous access point of the mobile station using information included in the reassociation message and terminates the temporary connection in response to an optimum connection being established with the mobile station. The reassociation message process unit may output the response message to the mobile station in response to the temporary connection being established.

The access point may further comprise an optimum connection search unit which establishes an optimum connection with the mobile station. The access point may further comprise a distributed service unit which stores the channel information.

To achieve the above and/or other aspects of the present invention, according to another embodiment of the present invention, there is provided an access point performing a handoff with respect to a mobile station in a wireless local area network, the access point comprising a reassociation message process unit which receives a reassociation message and outputs a response message corresponding to the reassociation message to the mobile station, and a temporary connection/termination process unit which establishes a temporary connection with a previous access point of the mobile station using information included in the reassociation message.

The access point may buffer data received from the previous access point through the temporary connection. The access point may further comprise an optimum connection search unit which establishes an optimum connection with the mobile station. The temporary connection/termination process unit may terminate the temporary connection in response to an optimum connection being established with the mobile station.

To achieve the above and/or other aspects of the present invention, according to an embodiment of the present invention, there is provided an apparatus for use in an access point performing a handoff with respect to a mobile station in a wireless local area network, comprising a channel information collection unit which collects channel information on access points in an extended service set in response to a handoff alert signal, and a temporary connection/termination process unit for establishing a temporary connection between predetermined access points subject to the handoff operation in response to a reassociation signal.

To achieve the above and/or other aspects of the present invention, according to an embodiment of the present invention, there is provided a mobile station for use in a wireless local area network, comprising a handoff alert message process unit which receives channel information on access points in an extended service set from a present access point, and a scanning unit which scans for a new access point by using the channel information.

The handoff alert message process unit may comprise a handoff alert message send unit which outputs a handoff alert message to the present access point, and a handoff alert acknowledgment message receiving unit which receives a response message corresponding to the handoff alert message, the channel information being included in the response message.

The apparatus may further comprise an access point selection unit which selects an access point with a strongest signal as the new access point according to a scanning result of the scanning unit. The apparatus may further comprise a distributed service unit which stores the channel information on the access points. The apparatus may further comprise a signal strength detection unit which detects a signal strength of the access points, wherein the handoff alert message send unit outputs the handoff alert message in response to a predetermined signal strength of the present access point. The apparatus may further comprise a reassociation message process unit which establishes a reassociation message process unit which outputs a reassociation message including information on the present access point, and receives a reassociation response message from the new access point in response to a temporary connection being established between the new access point and the present access point.

To achieve the above and/or other aspects of the present invention, according to another embodiment of the present invention, there is provided a mobile station comprising a handoff alert message process unit which receives channel information on access points in an extended service set from a present access point, a scanning unit which scans for a new access point by using the channel information, an access point selection unit which selects an access point with a strongest signal as the new access point according to a scanning result of the scanning unit, a distributed service unit which stores the channel information on the access points, a signal strength detection unit which detects a signal strength of the access points, and a reassociation message process unit which establishes a reassociation with the new access point.

To achieve the above and/or other aspects of the present invention, according to an embodiment of the present invention, there is provided an apparatus for use in a mobile station in a wireless local area network, comprising a handoff alert message send unit which outputs a handoff alert message to a present access point of the mobile station to collect channel information on access points in an extended service set, and a handoff alert acknowledgment message receiving unit which receives a response message corresponding to the handoff alert message, the channel information being included in the response message.

The apparatus may further comprise a scanning unit which scans for a new access point using the channel information.

To achieve the above and/or other aspects of the present invention, according to an embodiment of the present invention, there is provided a computer readable medium encoded with operating instructions for implementing a handoff method for a mobile station in a wireless local area network, performed by a computer, the method comprising receiving channel information on access points in an extended service set from a present access point of the mobile station, and scanning channels by using the channel information to select a new access point of the mobile station.

The method may further comprise outputting a handoff alert message to the present access point, wherein the receiving of the channel information comprises receiving a response message corresponding to the handoff alert message, the response message including the channel information.

To achieve the above and/or other aspects of the present invention, according to another embodiment of the present invention, there is provided a computer readable medium encoded with operating instructions for implementing a handoff method for a mobile station in a wireless local area network, performed by a computer, the method comprising selecting a new access point, outputting a reassociation message to the new access point, and receiving a reassociation response message from the new access point in response to a temporary connection being established between the new access point and a previous access point of the mobile station. The selecting of the new access point may comprises outputting a handoff alert message to the previous access point, receiving a response message from the previous access point, the response message including channel information on access points in an extended service set, scanning channels by using the channel information included in the response message, and selecting an access point with a strongest signal as the new access point.

To achieve the above and/or other aspects of the present invention, according to still another embodiment of the present invention, there is provided a computer readable medium encoded with operating instructions for implementing a handoff method for an access point of a mobile station in a wireless local area network, performed by a computer, the method comprising collecting channel information on access points in an extended service set in response to receiving a handoff alert message from the mobile station, and outputting a response message corresponding to the handoff alert message to the mobile station, the response message including the channel information.

To achieve the above and/or other aspects of the present invention, according to yet another embodiment of the present invention, there is provided a computer readable medium encoded with operating instructions for implementing a handoff method for an access point a mobile station in a wireless local area network, performed by a computer, the method comprising establishing a temporary connection with a previous access point of the mobile station in response to receiving a reassociation message, outputting a reassociation response message corresponding to the reassociation message to the mobile station in response to establishing the temporary connection, establishing an optimum connection with the mobile station, and terminating the temporary connection with the previous access point in response to establishing the optimum connection.

To achieve the above and/or other aspects of the present invention, according to an embodiment of the present invention, there is provided a method in a computer system for implementing a handoff of a mobile station in a wireless local area network, the method comprising controlling a channel information collection unit to collect channel information on access points in an extended service set in response to receiving a handoff alert message from the mobile station, and controlling a handoff alert message process unit to output a response message corresponding to the handoff alert message to the mobile station, the channel information being included in the response message.

To achieve the above and/or other aspects of the present invention, according to another embodiment of the present invention, there is provided a method in a computer system for implementing a handoff of a mobile station in a wireless local area network, the method comprising controlling a temporary connection/termination process unit to establish a temporary connection with a previous access point of the mobile station in response to receiving a reassociation message from the mobile station, and controlling a reassociation message process unit to output a response message corresponding to the reassociation message to the mobile station in response to establishing the temporary connection. The method in a computer system may further comprise controlling an optimum connection search unit to establish an optimum connection with the mobile station, and controlling the temporary connection/termination process unit to terminate the temporary connection with the previous access point in response to establishing the optimum connection.

To achieve the above and/or other aspects of the present invention, according to still another embodiment of the present invention, there is provided a method in a computer system for implementing a handoff of a mobile station in a wireless local area network, the method comprising controlling a channel information collection unit to collect channel information on access points in an extended service set in response to receiving a handoff alert message from the mobile station, and controlling a temporary connection/termination process unit to establish a temporary connection with a previous access point of the mobile station in response to receiving a reassociation message from the mobile station.

To achieve the above and/or other aspects of the present invention, according to yet another embodiment of the present invention, there is provided a method in a computer system for implementing a handoff of a mobile station in a wireless local area network, the method comprising controlling a handoff alert message process unit to obtain channel information on access points in an extended service set from a present access point, and controlling a scanning unit to scan for a new access point using the channel information. The method in a computer system may further comprise controlling an access point selection unit to select an access point with a strongest signal as the new access point according to a scanning result of the scanning unit. The method in a computer system may further comprise controlling a reassociation message process unit to establish a reassociation with the new access point.

To achieve the above and/or other aspects of the present invention, according to an embodiment of the present invention, there is provided a computer readable medium containing a data structure for storing channel information on access points in an extended service set, the channel information provided to a mobile station to select a new access point during a handoff in a wireless local area network, the data structure comprising address information on respective access points in the extended service set, information on channels used by the respective access points in the extended service set, and information on one or more access points adjacent to each of the respective access points in the extended service set.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
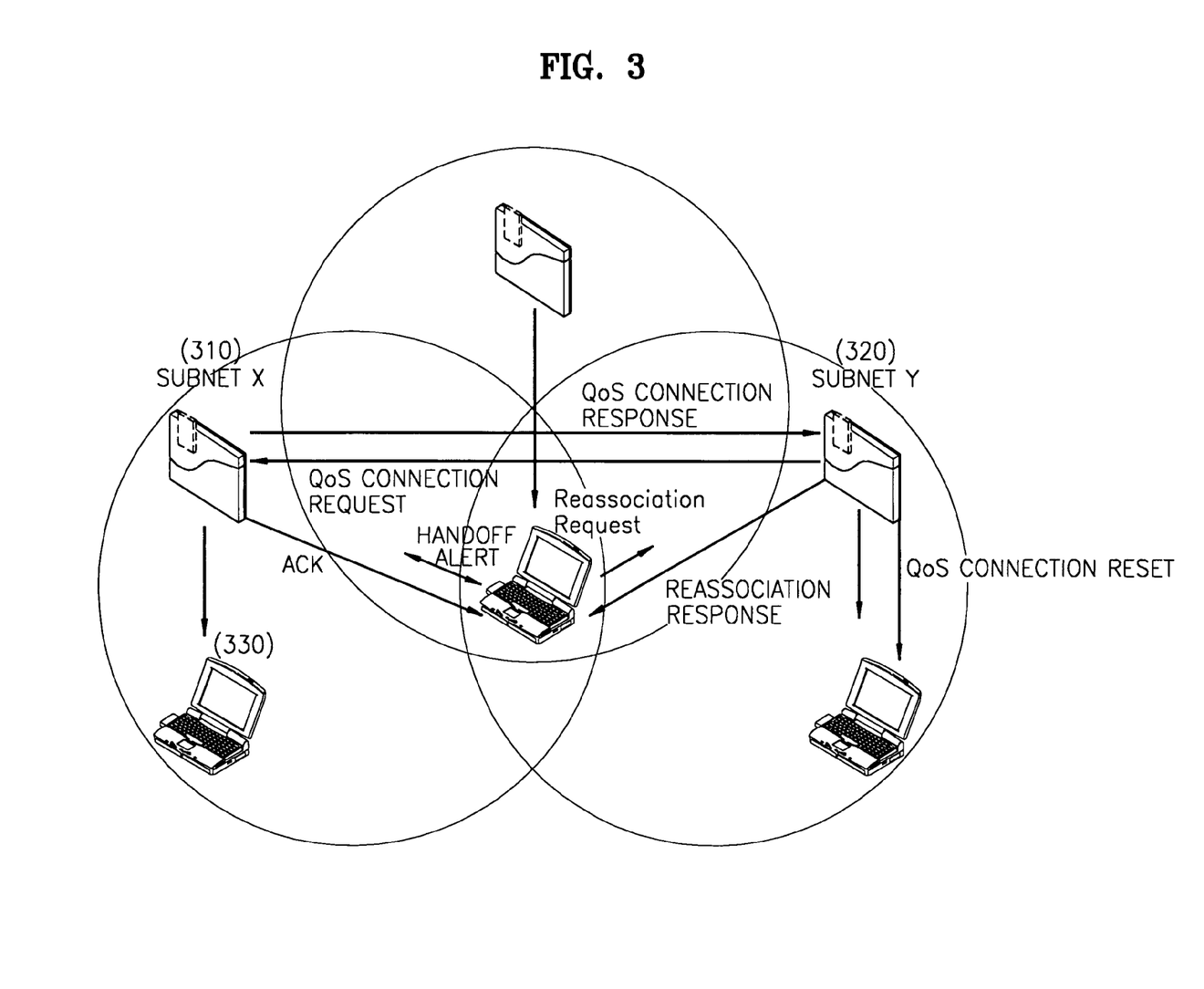
FIG. 3 is a diagram illustrating a wireless LAN in which a handoff operation according to an embodiment of the present invention takes place.

FIG. 3 shows a wireless local area network (LAN) in which a handoff operation according to an embodiment of the present invention occurs. As shown in FIG. 3, a handoff operation is shown of a mobile station 330 from a subnet X 310 to a subnet Y 320 while maintaining a quality of service (QoS) connection. Where the mobile station 330 receives a weak signal from the present access point (AP) of subnet X 310, it sends a handoff alert message to the present AP, and the present AP responds with an acknowledgement message. For example, information on a maximum of four channels of adjacent APs is included in the acknowledgement message. The mobile station 330 proceeds to scan the channels using the information of the adjacent APs.

As a result of the scanning process, the mobile station 330 sends a reassociation request message to the AP with the strongest signal, in this scenario, the AP of subnet Y 320. The reassociation request message includes the MAC address of the previous AP, i.e., the AP of subnet X 310. This information notifies the new AP of subnet Y 320 that the mobile station 330 is doing a handoff to the new AP of subnet Y 320. The new AP of subnet Y 320 then establishes a temporary QoS connection to the previous AP of subnet X 310. At this point, the previous AP of subnet X 310 no longer provides services to the mobile station 330, and the new AP of subnet Y 320 begins to buffer data received from the previous AP of subnet X310. The buffering continues until a reassociation response message is sent to the mobile station 330, upon which provides services to the mobile station 330. The new AP of subnet Y 320 adjusts the reassociation to detect an optimum connection and continues to provide the services to the mobile station 330. After the QoS connection is established by the new AP of subnet Y 320, the temporary connection between the previous AP of subnet X 310 and the new AP of subnet Y 320 is terminated.

Figure 4A:
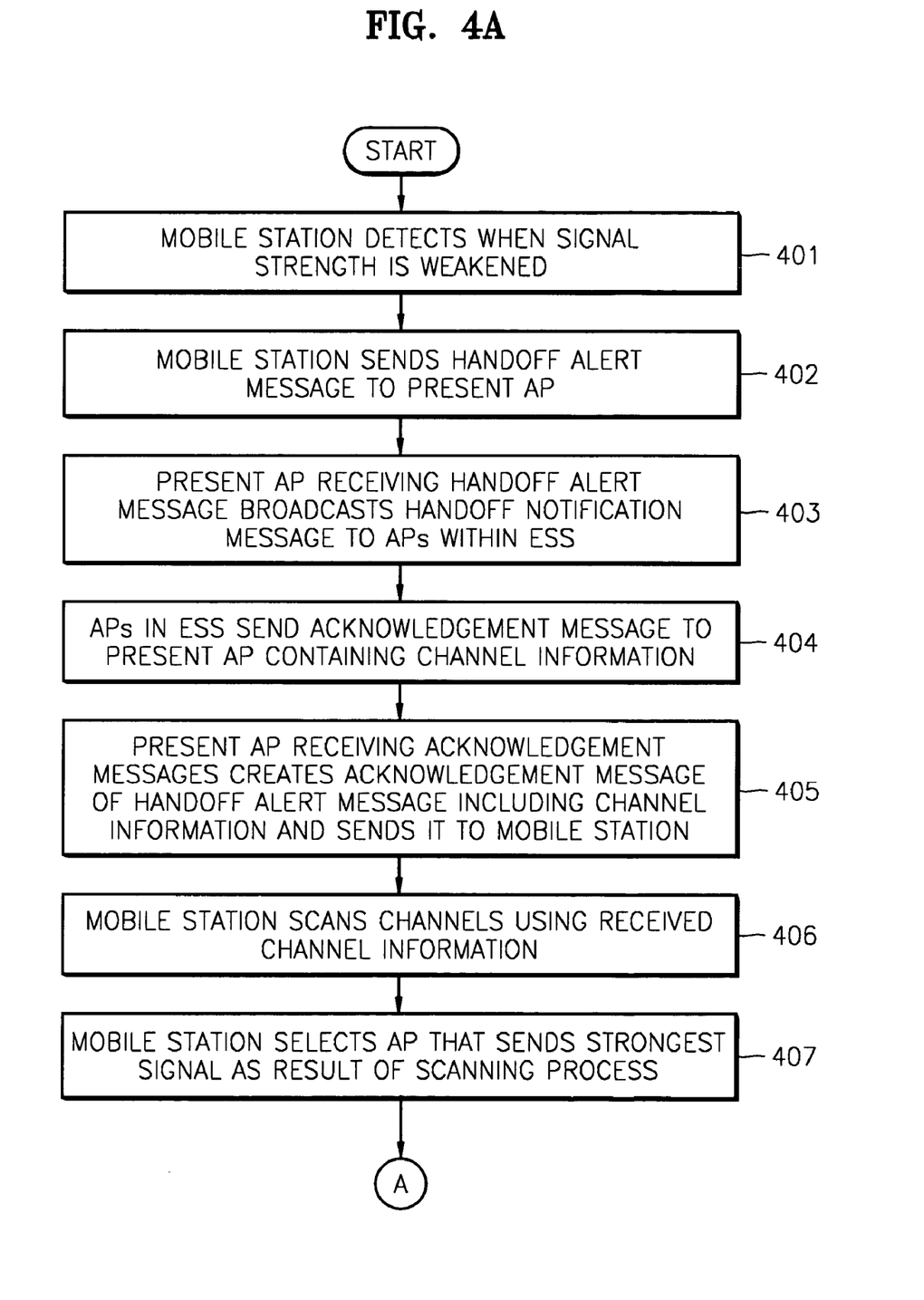
FIGS. 4A and 4B are flowcharts illustrating a handoff method according to an embodiment of the present invention.
Figure 4B:
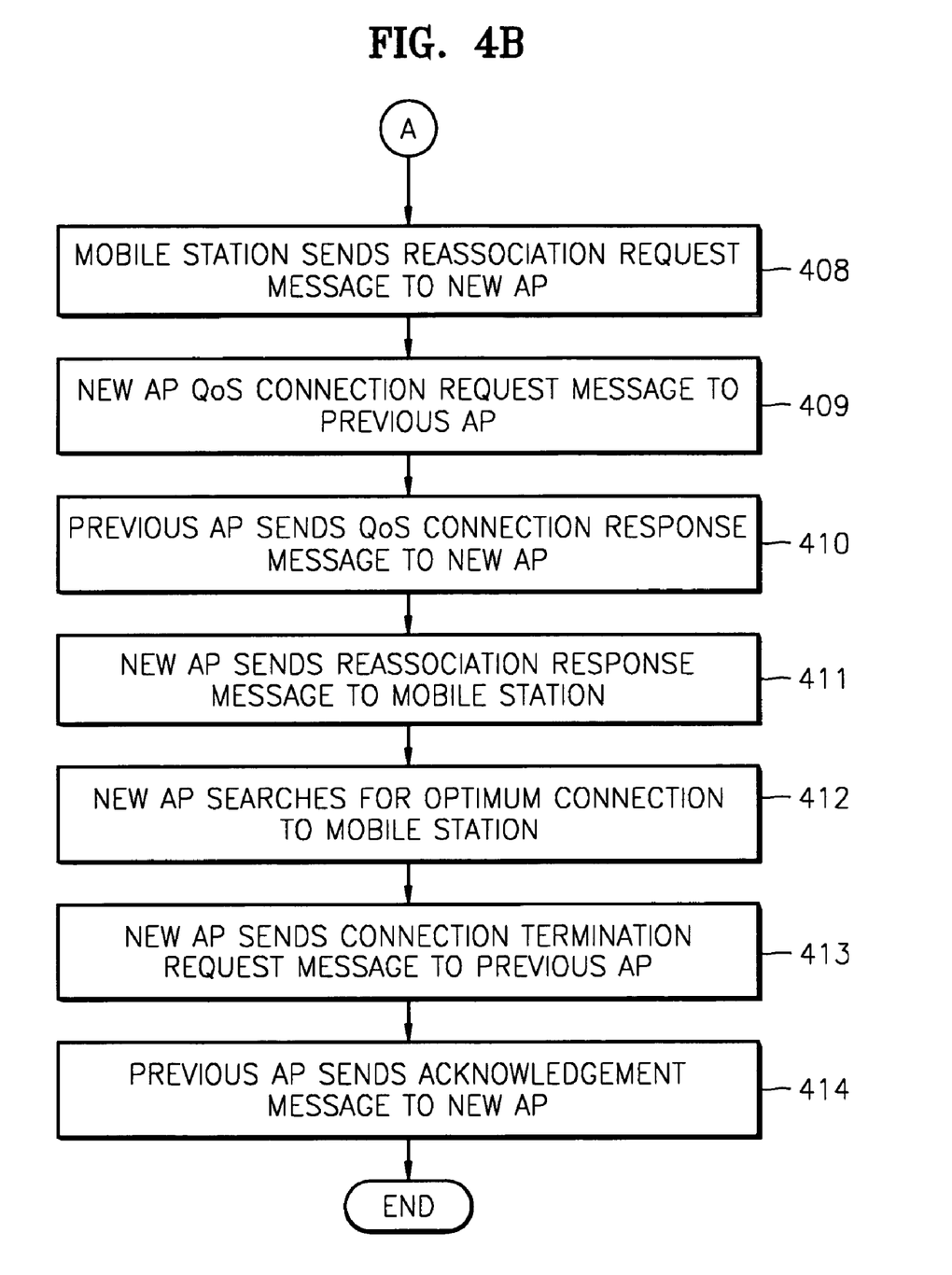

FIGS. 4A and 4B illustrate a handoff method according to an embodiment of the present invention.

Referring to FIG. 4A, in operation 410, as a mobile station moves, it detects when a strength of a signal received from a presently connected AP is weakened. In operation 402, the mobile station then sends a handoff alert message to the present AP, i.e., the AP that is providing services to the mobile station. The handoff alert message informs the present AP of the handoff and requests the present AP to send information on other APs. Where the present AP receives the handoff alert message, the present AP broadcasts a handoff notification message to APs within an extended service set (ESS), in operation 403. The broadcast serves as a request for channel information.

In response, the APs in the ESS send response messages having the channel information to the present AP in operation 404. In operation 405, the present AP receiving the response messages creates an acknowledgement message, including the channel information, corresponding to the handoff alert message and sends it to the mobile station. In operation 406, the mobile station scans channels using the channel information received from the present AP. Here, the scanning time is reduced, as compared to the conventional method described with respect to FIGS. 1 and 2, because the mobile station scans, for example, only the channels received from the present AP. As a result of the scanning process, the mobile station selects the AP that sends the strongest signal, in operation 407.

Referring to FIG. 4B, in operation 408, the mobile station sends a reassociation request message, which includes information on both the previous AP and the mobile station, to the newly selected AP. In operation 409, the new AP that receives the reassociation request message and sends a QoS connection request message to the previous AP to establish a temporary connection to the previous AP. In operation 410, the previous AP after receiving the QoS connection request message, sends a QoS connection response message to the new AP. In operation 411, the new AP sends a reassociation response message to the mobile station. Until this message is sent, the new AP buffers data that is received from the previous AP through the temporary connection. By buffering the data using the temporary connection, the loss of data which is likely to occur during the roaming process of the mobile station may be prevented. In addition, the previous AP no longer provides services to the mobile station after the temporary connection to the new AP is established.

In operation 412, the new AP searches for an optimum connection to the mobile station using a known or to be known methods. In operation 413, where the optimum connection is established, the new AP sends a connection termination request message to the previous AP, indicating termination of the temporary connection. In operation 414, the previous AP receives the connection termination request message and sends an acknowledgement message to the new AP. At that point, the temporary connection between the previous AP and the new AP is terminated.

Figure 5:
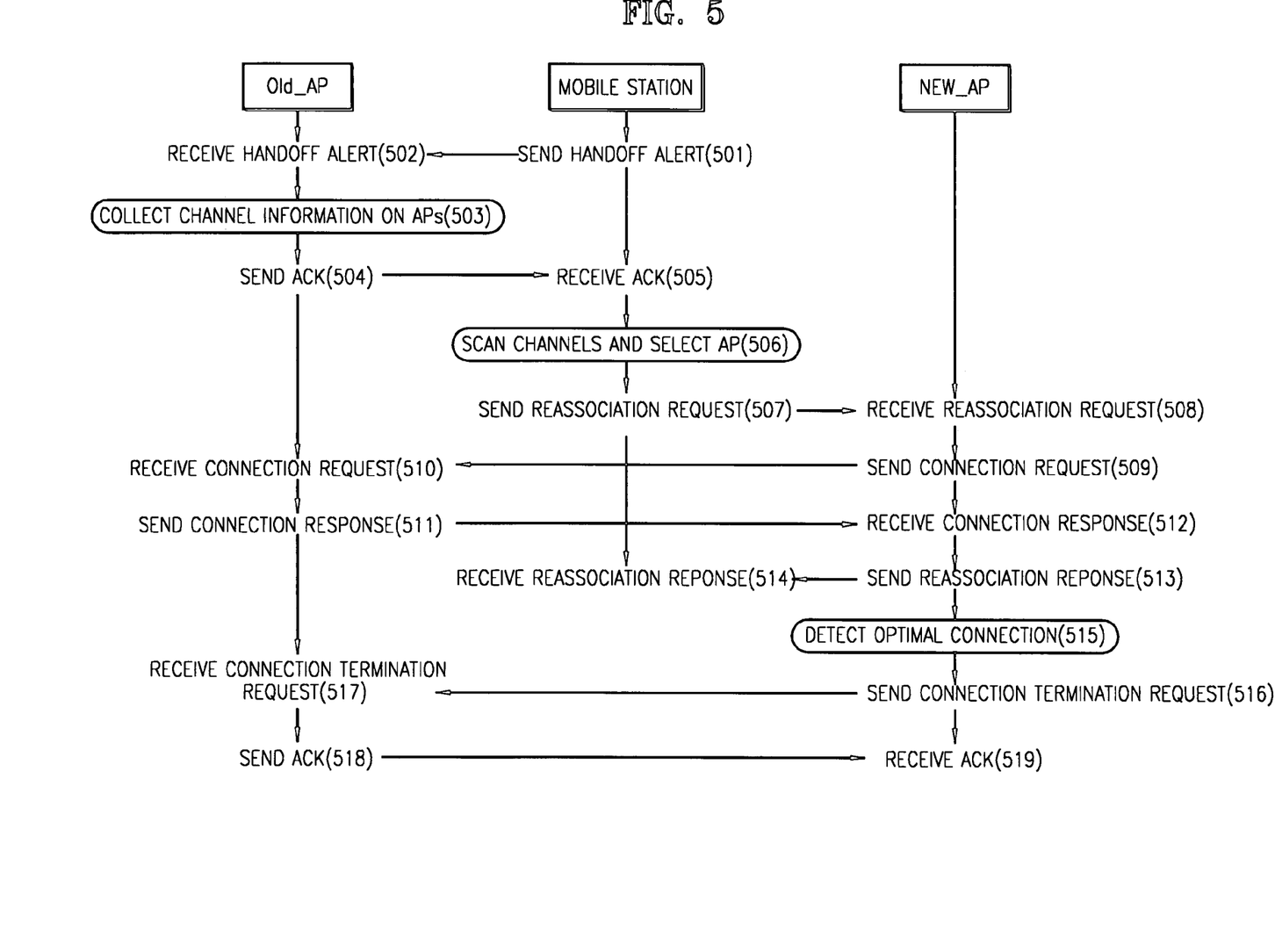
FIG. 5 illustrates the flow of messages in a handoff operation according to the present invention.

FIG. 5 illustrates the flow of messages in a handoff operation according to the present invention. In operation 501, a mobile station sends a handoff alert message to a previous AP Old_AP. The previous AP Old_AP receives the handoff alert message in operation 502, and collects channel information on APs within an ESS in operation 503. In operation 504, the previous AP Old_AP creates an acknowledgement message corresponding to the handoff alert message, including the collected channel information, and sends the created acknowledgement message to the mobile station.

The mobile station receives the acknowledgement message in operation 505, and scans channels using the channel information included in the acknowledgement message. In operation 506, the mobile station selects a new AP. In operation 507, the mobile station sends a reassociation request message to the new AP new_AP. The new AP new_AP receives the reassociation request message in operation 508, and sends a connection request message to temporary connect to the previous AP Old_AP in operation 509. The previous AP Old_AP receives the connection request message in operation 510, and sends a connection response message to the new AP new_AP in operation 511. The new AP new_AP receives the connection response message in operation 512, and sends a reassociation response message to the mobile station in operation 513. The mobile station receives the reassociation response message in operation 514.

Where the new AP new_AP detects an optimum connection in operation 515, the new AP new_AP sends a connection termination request message to the previous AP Old_AP to terminate the temporary connection, in operation 516. The previous AP Old_AP receives the connection termination request message in operation 517, and sends an acknowledgement message to the new AP new_AP in operation 518.

Figure 6:
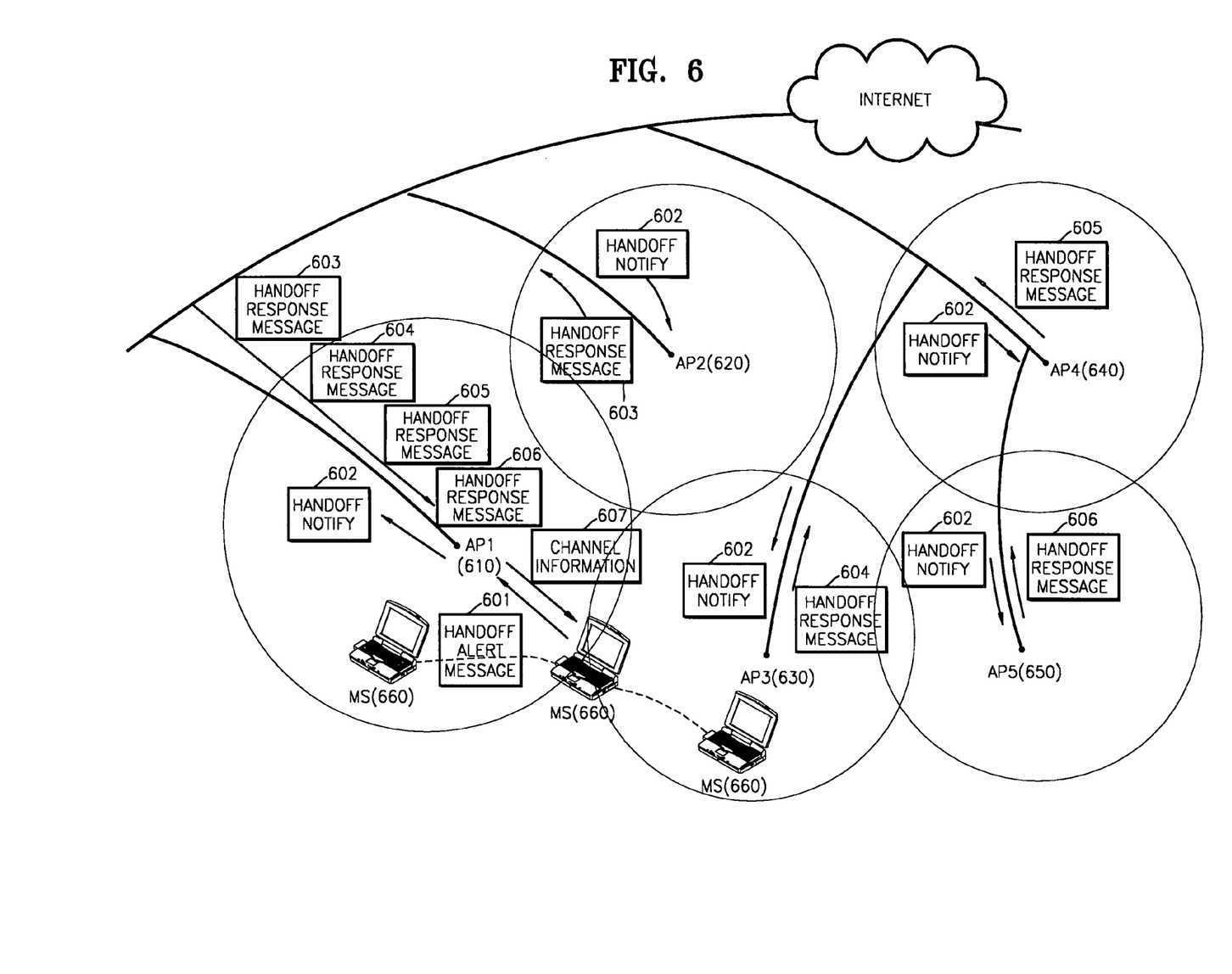
FIG. 6 is a diagram illustrating a wireless LAN for explaining how a current access point (AP) in a handoff operation collects channel information on other APs, according to the present invention.
Figure 7:
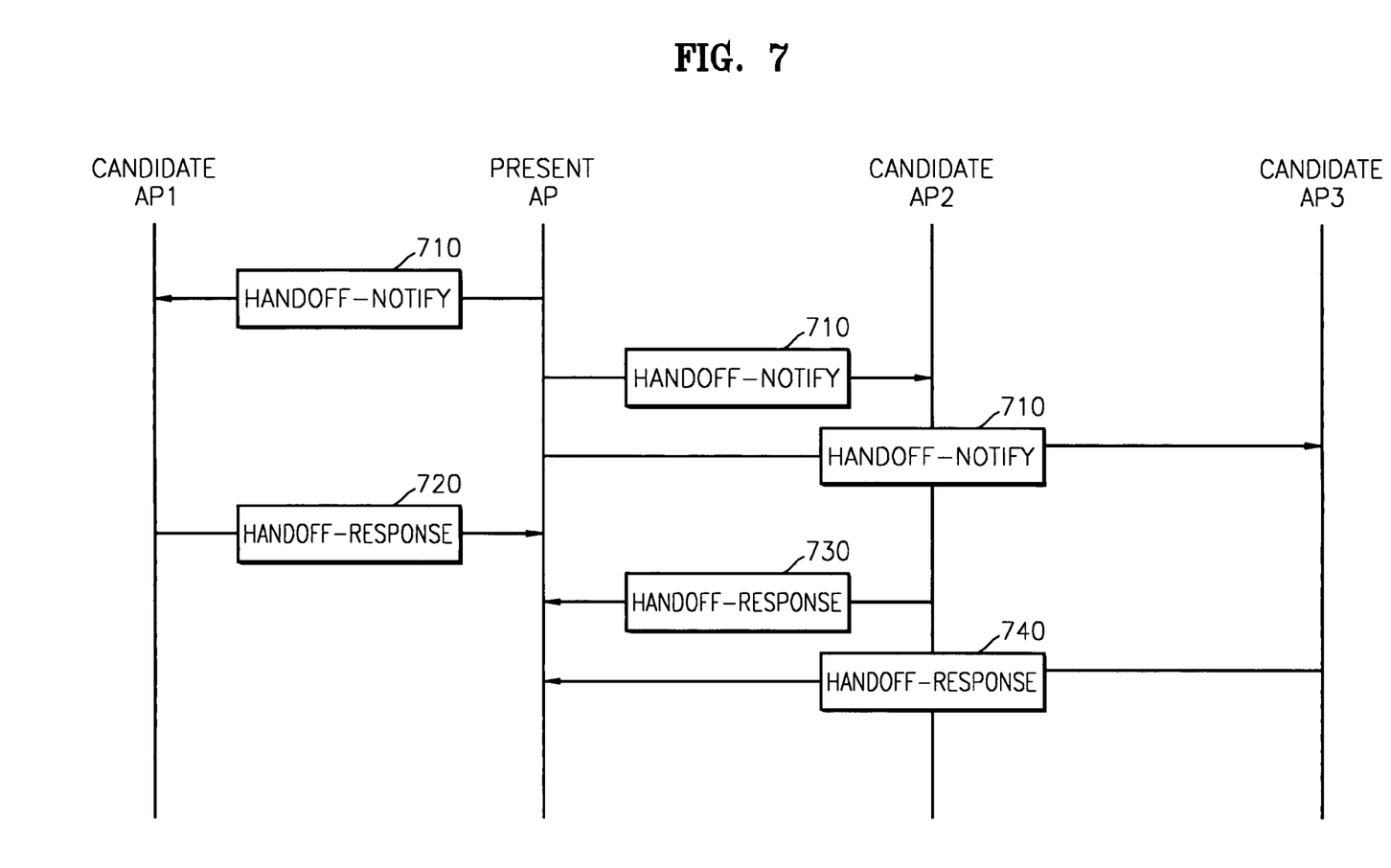
FIG. 7 illustrates the flow of messages for explaining how a current AP collects channel information from other APs during a handoff operation, according to the present invention.

FIG. 6 illustrates a wireless LAN to explain how a present AP in a handoff operation collects channel information on APs within an ESS, according to an embodiment of the present invention. FIG. 7 illustrates the flow of messages where the present AP receives the channel information from other APs during the handoff operation, according to the present invention. The method of collecting channel information on other APs will now be described with reference to FIGS. 6 and 7.

A mobile station 660 sends a handoff alert message 601 to an AP1 610, which is the present AP. The AP1 610 broadcasts handoff notification messages 602 to an AP2 620, an AP3 630, an AP4 640, and an AP5 650 that are included in an extended service set ESS. AP2 620 through AP5 650 that received the handoff notification messages 602 send handoff response messages, which include channel information for AP2 620 through AP5 650. More specifically, the AP2 620, the AP3 630, the AP4 640, and the AP5 650 send the handoff response messages 603, 604, 605, and 606, respectively, to the AP1 610. The AP1 610 receives the handoff response messages 603 through 606 from AP2 through AP5 650 and generates, for example, a distributed service table (DST) using the received channel information. AP1 610 sends DST information, i.e., channel information 607, to the mobile station 660. Accordingly, the mobile station 660 recognizes the channel information 607 of the adjacent APs 620 through 650.

The flow of the messages in the process described above is shown in FIG. 7. The present AP sends handoff notification messages 710, requesting channel information, to the adjacent APs. Thereafter, the AP1, the AP2, and the AP3 send handoff response messages 720, 730, and 740, respectively, to the present AP. Accordingly, the present AP obtains information on the adjacent APs. It is understood that according to various aspects of the present invention, an access point may request information on adjacent APs, and configure information on the adjacent APs by extracting necessary information from signals received from the adjacent APs. Furthermore, the access point may update information on the adjacent APs stored in, for example, the above described DST, periodically or non-periodically.

Figure 8:
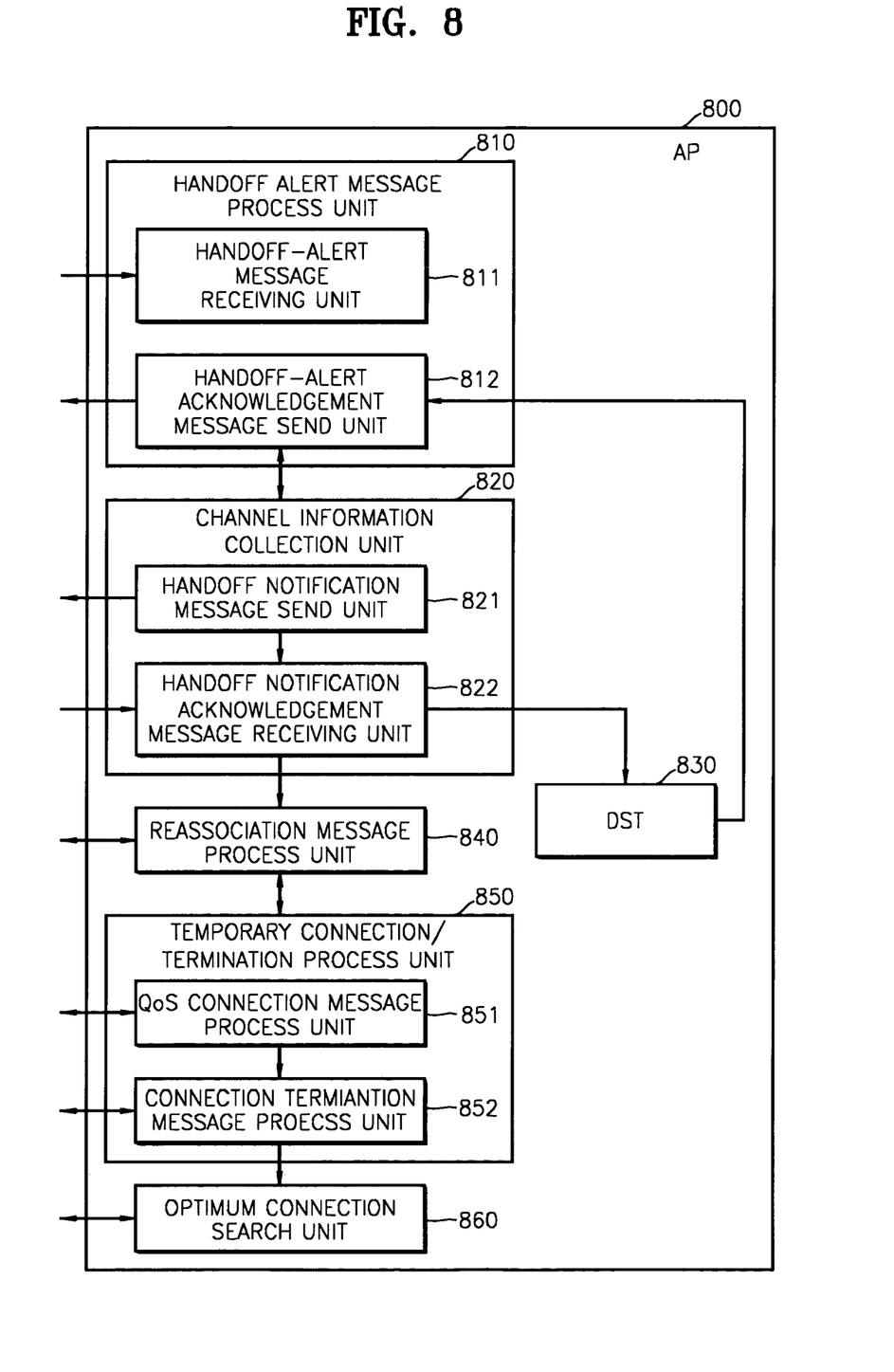
FIG. 8 is a block diagram illustrating the structure of an AP that performs a handoff operation, according to an embodiment of the present invention.

FIG. 8 illustrates the structure of an AP that performs a handoff operation, according to an embodiment of the present invention. The AP 800 comprises a handoff alert message process unit 810, a channel information collection unit 820, a DST 830, a reassociation message process unit 840, a temporary connection/termination process unit 850, and an optimum connection search unit 860.

The handoff alert message process unit 810 receives a handoff alert message from a mobile station and sends a response message corresponding to the received handoff alert message. The channel information collection unit 820 requests and collects channel information on APs in an ESS. The DST 830 is, for example, a table which stores the collected channel information. The reassociation message process unit 840 receives a reassociation message from a mobile station and sends a response message corresponding to the reassociation message. The temporary connection/termination process unit 850 establishes a temporary connection and terminates the temporary connection. The optimum connection search unit 860 searches for and processes an optimum connection.

The handoff alert message process unit 810 comprises a handoff alert message receiving unit 811 which receives the handoff alert message, and a handoff alert acknowledgement message send unit 812 which sends the response message corresponding to the handoff alert message. The channel information collection unit 820 comprises a handoff notification message send unit 821 which sends a handoff notification message requesting the channel information on the APs in the ESS, and a handoff notification acknowledgement message receiving unit 822 which receives a response message corresponding to the handoff notification message.

Figure 9:
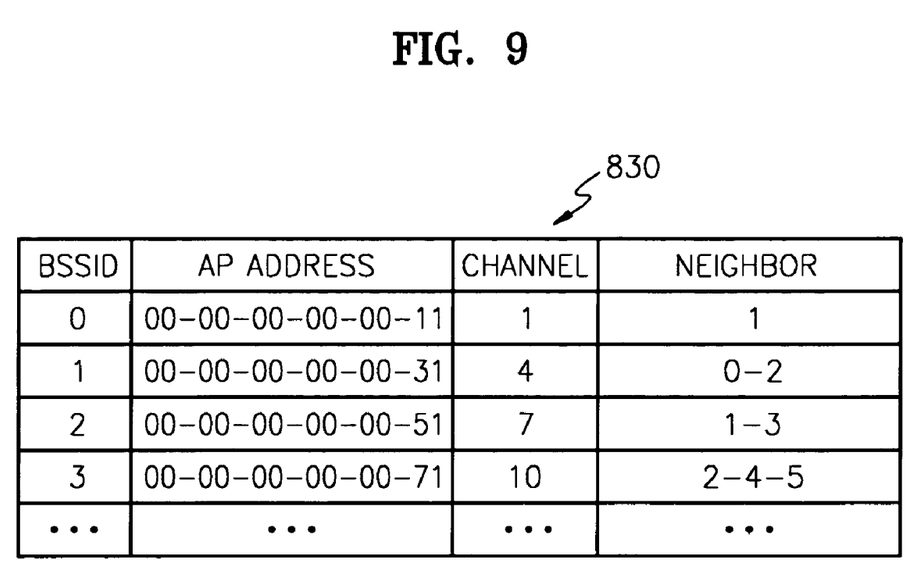
FIG. 9 is a table illustrating data in a distributed service table (DST) shown in FIG. 8.

The DST 830 stores the channel information included in the handoff notification acknowledgement message. The data stored in the DST 830 is exemplified in FIG. 9. According to an embodiment of the present invention, the DST 830 includes basic service set identifications (BSSIDs) representing basic service set (BSS) identifiers, AP addresses, information on channels used by the respective APs, and information on the APs' adjacent APs.

The temporary connection/termination process unit 850 comprises a QoS connection message process unit 851 which establishes the temporary connection between a new AP and a previous AP, and a connection termination message process unit 852 which terminates the temporary connection after the optimum connection is established.

Figure 10:
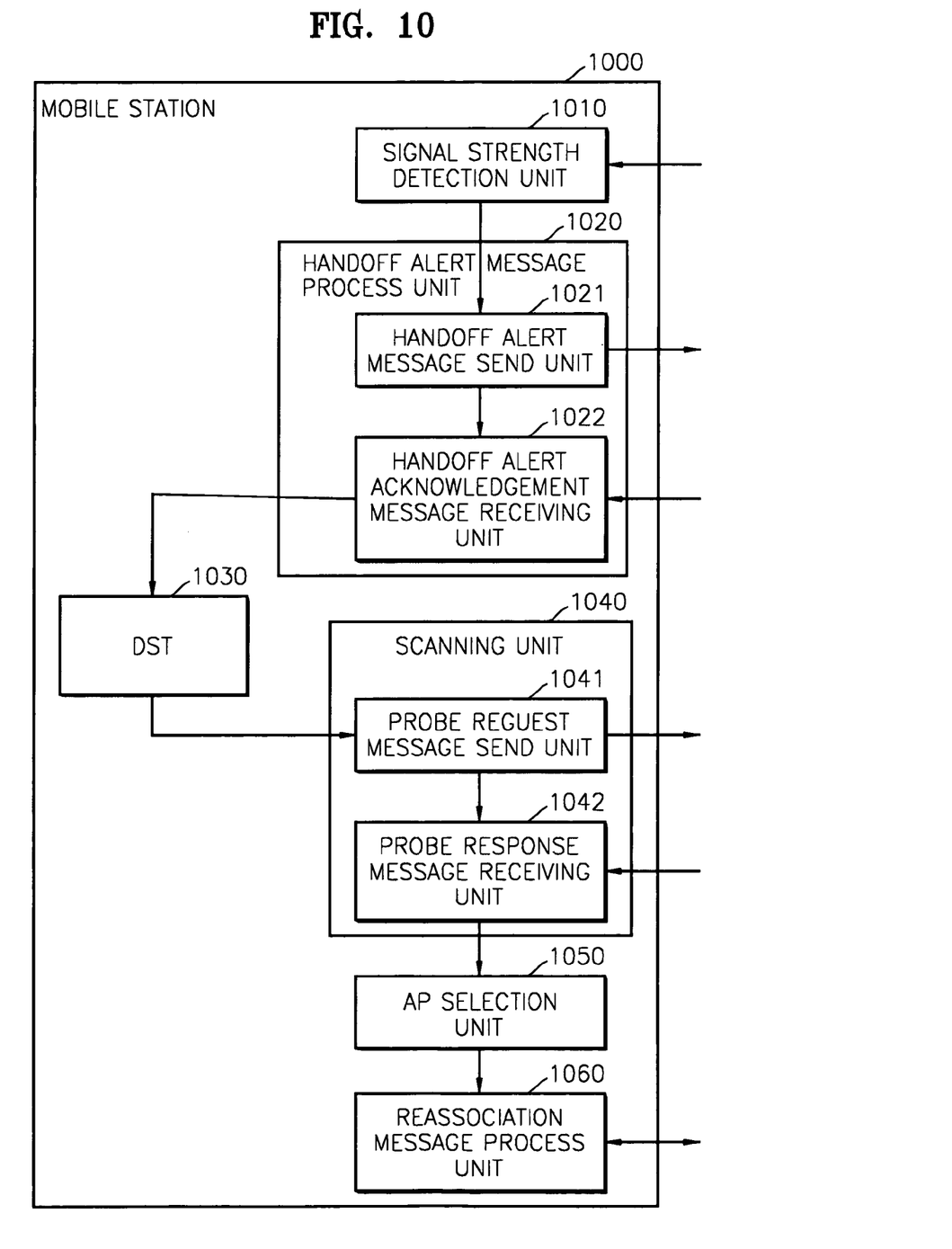
FIG. 10 is a block diagram illustrating the structure of a mobile station that performs a handoff operation, according to an embodiment of the present invention.

FIG. 10 illustrates the structure of a mobile station that performs a handoff operation, according to an embodiment of the present invention. The mobile station 1000 comprises a signal strength detection unit 1010, a handoff alert message process unit 1020, a DST 130, a scanning unit 1040, an AP selection unit 1050, and a reassociation message process unit 1060.

The signal strength detection unit 1010 detects the strength of signals from APs. Where a weakened signal is detected from a present AP and handoff begins, the handoff alert message process unit 1020 sends a handoff alert message to the present AP and receives a response message from the present AP. The DST 1030 stores information including channel information on adjacent APs in an ESS. The channel information is obtained from the response message corresponding to the handoff alert message. The scanning unit 1040 scans the adjacent APs by using the channel information stored in the DST 1030. The AP selection unit 1050 selects an AP in the ESS that sends the strongest signal.

The handoff alert message process unit 1020 comprises a handoff alert message send unit 1021 which sends the handoff alert message to the present AP, and a handoff alert acknowledgement message receiving unit 1022 which receives the response message corresponding to the handoff alert message. The scanning unit 1040 comprises a probe request message send unit 1041 which sends a probe request message, using the channel information stored in the DST 1030, and a probe response message receiving unit 1042 which receives a response message corresponding to the probe request message.

As described above, according to an aspect of the present invention, since a mobile station in a wireless LAN does not scan the entire channels in a channel band, rather, for example, only those channels that are substantially present where a handoff operation begins, a probing delay is reduced. For example, where the number of channels is 12, a MinChannelTime is 20 ms, and a MaxChannelTime is 40 ms, a conventional handoff method described with respect to FIGS. 1 and 2 requires 320 ms for the handoff operation. However, a handoff method according to an embodiment of the present invention requires, for example, 80 ms for the handoff operation. The amount of time for a mobile station to detect channels in a handoff is reduced. According to another aspect of the present invention, a temporary connection between a new AP and a previous AP is established. Accordingly, the new AP can buffer data and data loss due to a handoff operation may be prevented. For example, before sending a reassociation response message to the mobile station, the new AP uses the temporary connection to buffer data that may be lost during roaming. Therefore, while not limited therefor, one or more aspects of the present invention secure a QoS in a wireless LAN.

While a mobile station has been shown in the accompanying figures as, for example, a portable computer, it is understood that the present invention is not limited thereto and is applicable to a variety of devices for use in a wireless network. It is also understood that while generating a table is described with respect to collected channel information, other means of representing and/or providing the channel information may be used.

It is understood that a system which uses the present invention also includes permanent or removable storage, such as magnetic and optical discs, RAM, and ROM, on which the process and data structures of the present invention can be stored and distributed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A handoff method performed by a mobile station in a wireless local area network, the method comprising the steps of:

outputting a handoff alert message to a present access point of the mobile station;

receiving a response message in response to the handoff alert message from the present access point of the mobile station, the response message comprising channel information requested by the present access point and received by the present access point from adjacent access points in an extended service set that are adjacent to the present access point;

scanning, by the mobile station, channels on the adjacent access points by using the channel information to select a new access point of the mobile station when the response message is received from the present access point, wherein the scanning channels comprises transmitting a probe request message to the adjacent access points using the channel information and receiving a response message in response to the probe request message; and selecting one of the adjacent access points with a strongest signal as the new access point according to a scanning result.

2. The method of claim 1, wherein the channel information comprises an address of the adjacent access point, information on a channel used by the adjacent access point, and information on one or more access points adjacent to the adjacent access point.

3. The method of claim 1, wherein the outputting of the handoff alert message comprises outputting the handoff alert message in response to receiving a weak signal from the present access point.

4. The method of claim 1, further comprising:
outputting a reassociation message to the new access point; and
receiving, by the mobile station, a reassociation response message from the new access point after a temporary connection is established between the new access point and a previous access point of the mobile station.

5. The method of claim 1, further comprising:
reassociating with the new access point in response to a temporary connection being established between the new access point and the present access point.

6. A mobile station for use in a wireless local area network, comprising:
a handoff alert message process unit which outputs a handoff alert message to a present access point of the mobile station and receives a response message in response to the handoff alert message from the present access point, the response message comprising channel information requested by the present access point and received by the present access point from adjacent access points in an extended service set that are adjacent to the present access point;
a scanning unit which scans for a new access point by using the channel information when the response message is received from the present access point, wherein the scanning unit transmits a probe request message to the adjacent access points using the channel information and receives a response message in response to the probe request message; and
an access point selection unit which selects one of the adjacent access points with a strongest signal as the new access point according to a scanning result of the scanning unit.

7. The mobile station of claim 6, further comprising a distributed service unit which stores the channel information on the adjacent access points.

8. The mobile station of claim 6, further comprising a signal strength detection unit which detects a signal strength of the adjacent access points, wherein the handoff alert message send unit outputs the handoff alert message in response to a predetermined signal strength of the present access point.

9. The mobile station of claim 6, further comprising a reassociation message process unit which establishes a reassociation with the new access point.

10. The mobile station of claim 6, further comprising a reassociation message process unit which outputs a reassociation message including information on the present access point, and receives a reassociation response message from the new access point in response to a temporary connection being established between the new access point and the present access point.

11. A non-transitory computer readable storage medium encoded with computer executable instructions for implementing a handoff method for a mobile station in a wireless local area network, performed by a computer, the method comprising:
outputting a handoff alert message to a present access point of the mobile station;
receiving a response message in response to the handoff alert message from the present access point of the mobile station, the response message comprising channel information requested by the present access point and received by the present access point from adjacent access points in an extended service set that are adjacent to the present access point;
scanning, by the mobile station, channels on the adjacent access points by using the channel information to select a new access point of the mobile station when the response message is received from the present access point, wherein the scanning channels comprises transmitting a probe request message to the adjacent access points using the channel information and receiving a response message in response to the probe request message; and
selecting one of the adjacent access points with a strongest signal as the new access point according to a scanning result.

12. The non-transitory computer readable medium claim of 11, the method further comprising:
outputting a reassociation message to the new access point; and
receiving a reassociation response message from the new access point in response to a temporary connection being established between the new access point and a previous access point of the mobile station.

* * * * *